United States Patent
Kawazoe et al.

(10) Patent No.: US 9,900,385 B2
(45) Date of Patent: Feb. 20, 2018

(54) CONNECTION MANAGEMENT DEVICE, COMMUNICATION SYSTEM, CONNECTION MANAGEMENT METHOD, AND COMPUTER PROGRAM PRODUCT

(71) Applicant: Kabushiki Kaisha Toshiba, Minato-ku (JP)

(72) Inventors: Hiroshi Kawazoe, Kawasaki (JP); Daisuke Ajitomi, Setagaya (JP); Keisuke Minami, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 461 days.

(21) Appl. No.: 14/605,414

(22) Filed: Jan. 26, 2015

(65) Prior Publication Data
US 2015/0256622 A1 Sep. 10, 2015

(30) Foreign Application Priority Data

Mar. 10, 2014 (JP) ................................. 2014-046696

(51) Int. Cl.
*H04L 29/08* (2006.01)

(52) U.S. Cl.
CPC ...... *H04L 67/1097* (2013.01); *H04L 67/1008* (2013.01); *H04L 67/141* (2013.01); *H04L 67/28* (2013.01)

(58) Field of Classification Search
CPC . H04L 67/1097; H04L 67/1008; H04L 67/28; H04L 67/141
See application file for complete search history.

(56) References Cited

U.S. PATENT DOCUMENTS

| 7,757,236 B1 | 7/2010 | Singh |
| 2011/0235522 A1 | 9/2011 | Matoba |

(Continued)

FOREIGN PATENT DOCUMENTS

| CN | 103067292 A | 4/2013 |
| JP | 2012-037944 A | 2/2012 |

(Continued)

OTHER PUBLICATIONS

I. Fette, et al., "The WebSocket Protocol" Internet Engineering Task Force (IETF), Standards Track, Dec. 2011, 71 pages http://tools.ietf.org/html/rfc6455.

(Continued)

*Primary Examiner* — Kim T Nguyen
(74) *Attorney, Agent, or Firm* — Oblon, McClelland, Maier & Neustadt, L.L.P.

(57) ABSTRACT

According to an embodiment, a connection management device is in a communication system in which relay devices are provided for relaying communication between two terminal devices associated with each other in advance. The connection management device determines the relay device with which each terminal device should establish connection. The connection management device includes a storage, an update unit, a request reception unit, and a determination unit. The storage stores state information including a loaded condition and/or terminal connection number for each relay device. The update unit updates the storage in accordance with a predetermined rule. The request reception unit receives, from any one of the terminal devices, a determination request of the relay device with which the terminal device should establish connection. The determination unit determines the relay device with which the terminal device making the determination request should establish connection, based on the state information stored in the storage.

20 Claims, 8 Drawing Sheets

(56) References Cited

U.S. PATENT DOCUMENTS

| | | |
|---|---|---|
| 2012/0036570 A1 | 2/2012 | Wada |
| 2012/0239821 A1* | 9/2012 | Hozumi ............ H04L 67/1008 |
| | | 709/238 |
| 2013/0054743 A1 | 2/2013 | Feher et al. |
| 2014/0082173 A1 | 3/2014 | Kaneko |
| 2015/0256626 A1 | 9/2015 | Ajitomi et al. |

FOREIGN PATENT DOCUMENTS

| | | |
|---|---|---|
| JP | 2012-175606 A | 9/2012 |
| JP | 2012-198669 A | 10/2012 |
| JP | 2013-218452 A | 10/2013 |
| JP | 2015-170041 A | 9/2015 |

OTHER PUBLICATIONS

"WebSocket," Nikkei Electronics, No. 1108, May 13, 2013, pp. 71-79.

Extended European Search Report dated May 22, 2015 in Patent Application No. 15151102.9.

* cited by examiner

| SERVER ID | 192.168.0.1 | 192.168.0.2 | ... |
|---|---|---|---|
| CPU UTILIZATION RATIO | 25% | 10% | ... |
| AMOUNT OF AVAILABLE MEMORY | 2 GB | 3 GB | ... |
| TERMINAL CONNECTION NUMBER | 10000 | 5000 | ... |

| TERMINAL ID | SERVER ID |
|---|---|
| 192.168.0.3 | 192.168.0.2 |
| ⋮ | ⋮ |

| SERVER ID | 192.168.0.1 | 192.168.0.2 | ... |
|---|---|---|---|
| CPU UTILIZATION RATIO | 25% | 10%→30% | ... |
| AMOUNT OF AVAILABLE MEMORY | 2 GB | 3 GB→0.5 GB | ... |
| TERMINAL CONNECTION NUMBER | 10000 | 5000→19000 | ... |

US 9,900,385 B2

CONNECTION MANAGEMENT DEVICE, COMMUNICATION SYSTEM, CONNECTION MANAGEMENT METHOD, AND COMPUTER PROGRAM PRODUCT

CROSS-REFERENCE TO RELATED APPLICATIONS

This application is based upon and claims the benefit of priority from Japanese Patent Application No. 2014-046696, filed on Mar. 10, 2014; the entire contents of which are incorporated herein by reference.

FIELD

An embodiment described herein relates generally to a connection management device, a communication system, a connection management method, and a computer program product.

BACKGROUND

Conventionally, WebSocket is known as a Web standard communication protocol for eliminating reconnection costs by maintaining established communication connections so as to achieve low delay. WebSocket is used, for example, in applications such as so-called smart remote control for transmitting control commands from a mobile terminal such as a smart phone via a relay server to customer premises equipment or the like connected to a network to control the equipment.

In order to respond to concurrent connections by a large number of clients, companies who provide such applications as services may provide a plurality of relay servers to cause the WebSocket connections with terminal devices, such as mobile terminals and customer premises equipment, to be dispersed among the plurality of relay servers. In this case, communication performance by the terminal device may vary depending on a loaded condition, a terminal connection number, and the like of the connected relay server. Accordingly, there is need for construction of a mechanism to properly determine with which relay server a terminal device that newly requests connection is to be connected.

DETAILED DESCRIPTION

According to an embodiment, a connection management device is in a communication system in which a plurality of relay devices are provided for relaying communication between two terminal devices associated with each other in advance. The connection management device determines the relay device with which each of the terminal devices should establish connection and notifies each of the terminal devices of the determination result. The connection management device includes a first storage, an update unit, a request reception unit, and a determination unit. The first storage stores therein state information including at least one of a loaded condition and terminal connection number with respect to each of the plurality of relay devices. The update unit updates the first storage in accordance with a predetermined rule. The request reception unit receives, from any one of the terminal devices, a determination request of the relay device with which the terminal device should establish connection. The determination unit determines the relay device with which the terminal device making the determination request should establish connection, based on the state information stored in the first storage.

Figure 1:
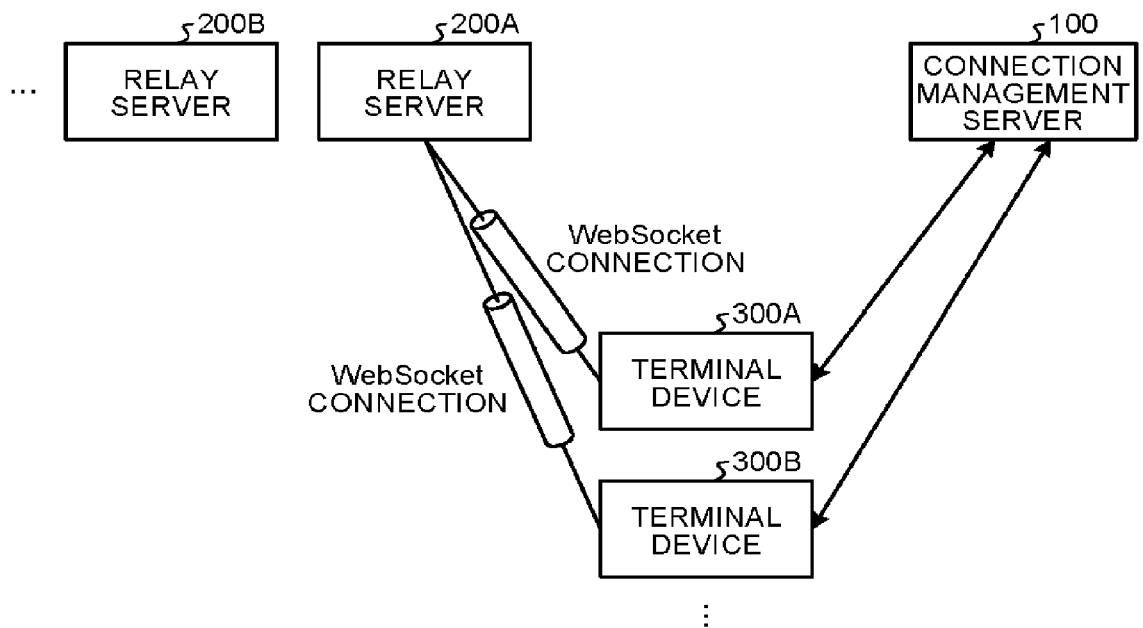
FIG. 1 is a diagram illustrating an outline of a communication system according to an embodiment.

FIG. 1 is a diagram illustrating an outline of a communication system according to the embodiment. As illustrated in FIG. 1, the communication system according to the embodiment includes a connection management server 100 (connection management device), a plurality of relay servers 200A, 200B, . . . (relay devices), and a plurality of terminal devices 300A, 300B, . . . . Although FIG. 1 illustrates two relay servers 200A and 200B and two terminal devices 300A and 300B, the number of relay servers and the number of terminal devices are arbitrary. In addition, a plurality of connection management servers 100 may be provided to have redundancy.

It is assumed that the terminal device 300A and the terminal device 300B are associated with each other in advance as a pair for performing two-way communication. An outline of a procedure by which the terminal device 300A and the terminal device 300B perform two-way communication by WebSocket in the communication system of the embodiment will now be described. In the following description, when generically named, the plurality of relay servers 200A, 200B, . . . , are notated as a relay server 200, while the plurality of terminal devices 300A, 300E, . . . , are notated as a terminal device 300.

The first terminal device 300A establishes connection with the relay server 200A on a web by WebSocket, and maintains the connected condition. Similarly, the second terminal device 300B also establishes connection with the relay server 200A by WebSocket. It is assumed that the relay server 200A knows in advance that two-way communication is to be performed between these two terminal devices 300A and 300B. After the connections with both of the two terminal devices 300A and 300B are established, when data is sent via the WebSocket connection from one terminal device 300 (for example, terminal device 300B), the relay server 200A transfers the data to the WebSocket connection with the other terminal device 300 (for example, terminal device 300A). The terminal device 300 (for example, terminal device 300A), which receives the transferred data, uses the data.

In this way, since the relay server 200A accommodates a pair of WebSocket connections of the terminal devices 300A and 300B, even in a case where a direct connection between the terminal devices 300A and 300B is difficult such as in a case where the terminal devices 300A and 300B are inside network address translation (NAT), it is possible to achieve two-way communication between the terminal devices 300A and 300B. Such a mechanism is applicable to, for example, applications such as smart remote control for performing remote control of customer premises equipment from a mobile terminal.

The above description presupposes that the terminal devices 300A and 300B know the relay server 200A with which the WebSocket connection is to be established. However, in order to respond to concurrent connections by a large number of clients (terminal device 300), the communication system of the embodiment provides the plurality of relay servers 200. With such a configuration, the terminal device 300 needs to know with which relay server 200 the WebSocket connection is to be established. Therefore, the communication system according to the embodiment includes the connection management server 100 for determining the relay server 200 with which the terminal device 300 should establish the WebSocket connection in response to a request from the terminal device 300, and for notifying the terminal device 300 that requests the connection, of a server ID that is identification information of the relay server 200, for example.

Figure 2:
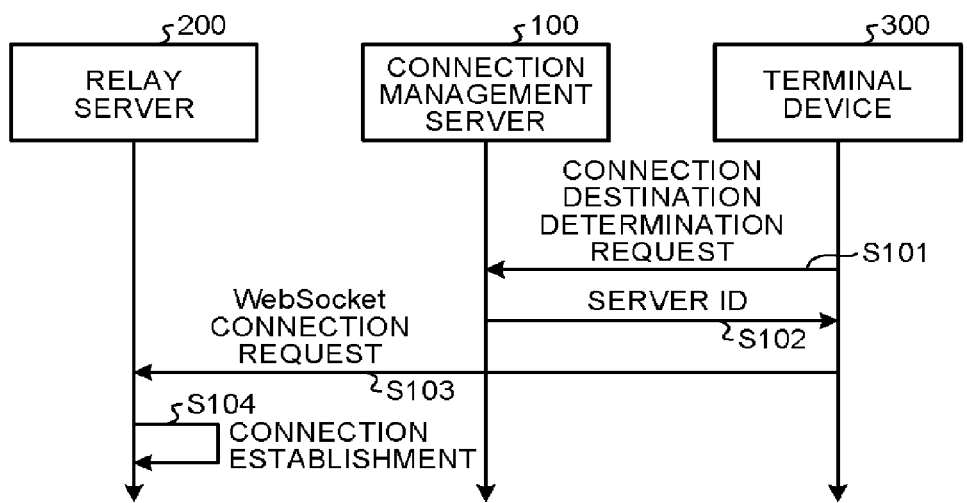
FIG. 2 is a sequence diagram illustrating an outline of processes until WebSocket connection is established.

FIG. 2 is a sequence diagram illustrating an outline of processes until the terminal device 300 establishes the WebSocket connection with the relay server 200 in the communication system of the embodiment.

The terminal device 300 first makes a connection destination determination request to the connection management server 100 (step S101), and acquires the server ID of the relay server 200 with which the WebSocket connection should be established (step S102). Then, the terminal device 300 makes a WebSocket connection request to the relay server 200 identified by the acquired server ID (step S103). Accordingly, the relay server 200 performs processes for establishing the WebSocket connection with the terminal device 300 in response to the connection request from the terminal device 300 (step S104).

Upon receipt of the connection destination determination request from the terminal device 300 at the above-described step S101, the connection management server 100 determines the relay server 200 with which the terminal device 300 should establish the WebSocket connection from among the plurality of relay servers 200, and notifies the terminal device 300 of the server ID of the relay server 200. At this time, the connection management server 100 determines the relay server 200 to be the connection destination for the terminal device 300 in a manner that gives consideration to avoiding concentration of loading on a specific relay server 200 depending on information (hereinafter referred to as state information) such as a current loaded condition (for example, resource usage situation), and a terminal connection number (the number of terminal devices 300 that have already established the WebSocket connection) with respect to each of the plurality of relay servers 200. This enables load dispersion even when a large number of terminal devices 300 use the communication system.

However, in such a communication system, when a fault occurs in either one of the plurality of relay servers 200, the connection management server 100 may not know the fault occurrence and may determine the relay server 200 in which the fault occurs as a connection destination for the terminal device 300. The connection management server 100 can detect abnormality in the relay server 200 by acquiring the state information of the relay server 200 at suitable time intervals. However, when a fault occurs during intervals between acquisitions of the state information, the connection management server 100 cannot detect the fault of the relay server 200 until the time of next acquisition of the state information. Accordingly, when the terminal device 300 makes a connection destination determination request before that time, the connection management server 100 may determine the relay server 200 that has the fault as a connection destination for the terminal device 300, and may notify the terminal device 300 of the server ID of the relay server 200. It becomes possible to shorten the time until the fault is detected by reducing the time interval at which the connection management server 100 acquires the state information of the relay server 200. However, this causes load increase in both the connection management server 100 and the relay server 200.

Therefore, in the embodiment, in addition to the connection management server 100 regularly acquiring the state information of the plurality of relay servers 200, the connection management server 100 irregularly acquires the state information of the relay server 200 as necessary to update the stored state information. This allows the connection management server 100 to immediately detect the fault that occurs in the relay server 200 while controlling load increase of both the connection management server 100 and the relay server 200, and allows the connection management server 100 to properly determine the relay server 200 with which the terminal device 300 should establish the WebSocket connection.

Figure 3:
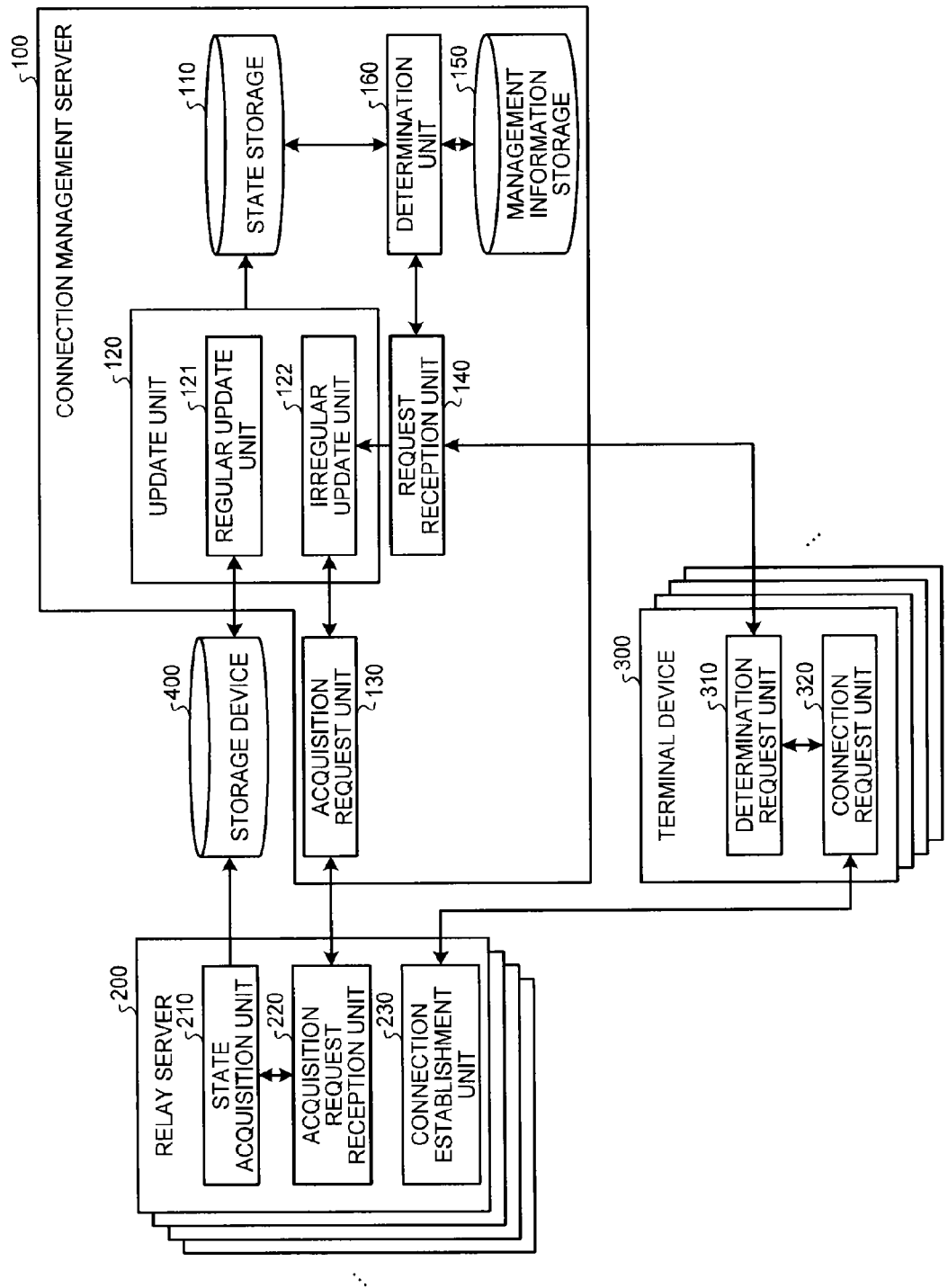
FIG. 3 is a block diagram illustrating an example of a functional configuration of the communication system according to the embodiment.

FIG. 3 is a block diagram illustrating an example of a functional configuration of the communication system of the embodiment. In the embodiment, it is assumed that the connection management server 100, the relay server 200, and the terminal device 300 exchange a hypertext transfer protocol (HTTP)-based request (HTTP request) and response (HTTP response). As illustrated in FIG. 3, in the embodiment, there is provided a storage device 400 capable of being accessed from the connection management server 100 and each of the plurality of relay servers 200.

First, the relay server 200 will be described. The plurality of relay servers 200 are each provided with a server ID that is unique identification information. In the embodiment, as an example, an Internet Protocol (IP) address of the relay server 200 is sued as the server ID of the relay server 200. The server ID is not limited to the IP address, and may be any information capable of uniquely identifying the relay server 200.

The relay server 200 functions as a WebSocket server, and for example, as illustrated in FIG. 3, includes a state acquisition unit 210, an acquisition request reception unit 220, and a connection establishment unit 230. The plurality of relay servers 200 has the same configuration.

The state acquisition unit 210 regularly acquires the state information of the relay server 200 at predetermined time intervals, associates the state information with the server ID of the relay server 200, and registers the information in the storage device 400. In addition, the state acquisition unit 210 irregularly acquires the state information of the relay server 200 in response to a request from the acquisition request reception unit 220, and returns the acquired state information to the acquisition request reception unit 220.

When the connection management server 100 makes an acquisition request of the state information, the acquisition request reception unit 220 receives this acquisition request, and requests the state acquisition unit 210 to acquire the state information. Then, the acquisition request reception unit 220 notifies the connection management server 100 of the state information that is irregularly acquired by the state acquisition unit 210 in response to the request from the acquisition request reception unit 220 as a response to the acquisition request.

When the terminal device 300 makes the WebSocket connection request, the connection establishment unit 230 receives this WebSocket connection request and establishes the WebSocket connection with the requesting terminal device 300 in accordance with a procedure determined by RFC6455 (see I. Fette, A. Melnikov, "The WebSocket Protocol", (online), December 2011, IETF REC6455, (retrieved on Feb. 27, 2014), the Internet (URL:http://tools.ietf.org/html/rfc6455). When establishment of the WebSocket connection with the requesting terminal device 300 fails, the connection establishment unit 230 notifies the requesting terminal device 300 of the status information that indicates a connection failure.

Next, the terminal device 300 will be described. The plurality of terminal devices 300 are each provided with a terminal ID that is unique identification information. In the embodiment, as an example, an IP address of the terminal device 300 is used as the terminal ID of the terminal device 300. The terminal ID is not limited to the IP address, and may be any information capable of uniquely identifying the terminal device 300. It is assumed that the terminal IDs of a pair of terminal devices 300 that perform two-way communication via the relay server 200 are associated with each other, and are registered in advance in the connection management server 100 and the relay server 200.

The terminal device 300 functions as a WebSocket client, and for example, as illustrated in FIG. 3, includes a determination request unit 310 and a connection request unit 320. The plurality of terminal devices 300 has the same configuration with respect to a function as the WebSocket client.

The determination request unit 310 makes a determination request (connection destination determination request) of the relay server 200 with which the terminal device 300 should establish the WebSocket connection to the connection management server 100. Then, the determination request unit 310 acquires the server ID of the relay server 200 with which the WebSocket connection should be established, and passes the acquired server ID to the connection request unit 320, the server ID being notified from the connection management server 100 in response to the connection destination determination request.

Based on the server ID passed from the determination request unit 310, the connection request unit 320 makes the WebSocket connection request to the relay server 200 identified by the server ID, and causes the relay server 200 to establish the WebSocket connection with the terminal device 300. At this time, when status information about a connection failure is notified from the relay server 200 indicating that WebSocket connection establishment has failed, the connection request unit 320 passes the status information together with the server ID of the relay server 200 to the determination request unit 310.

When the status information about the connection failure is passed from the connection request unit 320, the determination request unit 310 makes the connection destination determination request again to the connection management server 100. At this time, the determination request unit 310 makes the connection destination determination request including the server ID passed with the status information from the connection request unit 320, that is, the server ID of the relay server 200 that has failed in establishment of the WebSocket connection, to the connection management server 100.

When the WebSocket connection that has already been established with the relay server 200 is disconnected, the determination request unit 310 makes a connection destination determination request, to the connection management server 100, including the server ID of the relay server 200 with which the WebSocket connection has been disconnected. Examples of factors in disconnection of the WebSocket connection include fault occurrence in the relay server 200 and fault occurrence in a network appliance that lies between the terminal device 300 and the relay server 200. In addition, as will be described in detail later, the WebSocket connection may be disconnected by a disconnection request from the connection management server 100 to the relay server 200.

Next, the connection management server 100 will be described. The connection management server 100 functions as an HTTP server, and for example, as illustrated in FIG. 3, includes a state storage 110 (first storage), an update unit 120, an acquisition request unit 130, a request reception unit 140, a management information storage 150 (second storage), and a determination unit 160.

Figures 4, 5, 6:
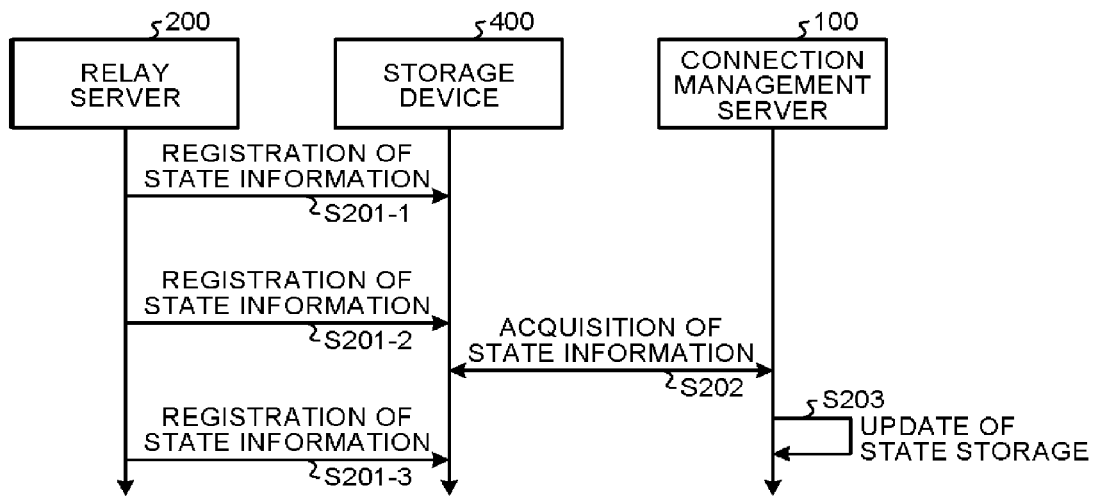
FIG. 4 is a diagram illustrating an example of state information stored by a state storage.
FIG. 5 is a diagram illustrating an example of management information stored by a management information storage.
FIG. 6 is a sequence diagram illustrating an outline of a regular update.

The state storage 110 stores therein state information of each of the plurality of relay servers 200. FIG. 4 is a diagram illustrating an example of the state information stored in the state storage 110. As the state information of each of the plurality of relay servers 200, for example, as illustrated in FIG. 4, the state storage 110 stores therein the loaded condition, such as a CPU utilization ratio and an amount of available memory capacity, and the terminal connection number with the server ID of the relay server 200, so as to be associated with one another.

The update unit 120 updates the state storage 110 in accordance with a predetermined rule. In the embodiment, the update unit 120 includes a regular update unit 121 (first update unit) and an irregular update unit 122 (second update unit).

The regular update unit 121 regularly accesses the storage device 400 at predetermined time intervals, acquires the state information registered by each of the plurality of relay servers 200 in the storage device 400 regularly, and updates the state storage 110. It is unnecessary that timing and intervals at which the regular update unit 121 accesses the storage device 400 coincide with timing and intervals at which the plurality of relay servers 20C register the state information in the storage device 400.

The irregular update unit 122 acquires the state information from the relay server 200 at irregular timing, for example, when the request reception unit 140 receives the connection destination determination request that includes a server ID of a specific relay server 20C from the terminal device 300, and updates the state storage 110. Specifically, when there is, for example, an update request of the state information that specifies a server ID from the request reception unit 140, the irregular update unit 122 makes a state information acquisition request of the relay server 200 identified by the server ID to the acquisition request unit 130. Then, the irregular update unit 122 receives the state information notified from the relay server 200 to the acquisition request unit 130, and updates the state storage 110.

In response to the request from the irregular update unit 122, the acquisition request unit 130 makes an acquisition request of the state information to the specified relay server 200. Then, in response to the acquisition request, the acquisition request unit 130 receives the state information notified from the relay server 200, and passes the state information to the irregular update unit 122.

The request reception unit 140 receives the connection destination determination request from the terminal device 300, and makes a determination request of the relay server 200 with which the requesting terminal device 300 should establish the WebSocket connection to the determination unit 160. Then, when the relay server 200 is determined by the determination unit 160, the request reception unit 140 notifies the requesting terminal device 300 of the server ID of the relay server 200 as a response of the connection destination determination request.

When the connection destination determination request from the terminal device 300 includes the server ID of the relay server 200, the request reception unit 140 specifies this server ID to make an update request of the state information to the irregular update unit 122.

The management information storage 150 stores therein management information that indicates a correspondence between the terminal device 300 and the relay server 200 between which the WebSocket connection has already been established. FIG. 5 is a diagram illustrating an example of the management information stored in the management information storage 150. For example, as illustrated in FIG. 5, the management information storage 150 stores therein the management information that associates the terminal ID of the terminal device 300 with the server ID of the relay server 200 between which the WebSocket connection has been established. Every time the determination unit 160 determines the relay server 200 with which the terminal device 300 having made the connection destination determination request should establish the WebSocket connection, a new record that associates the terminal ID of the terminal device 300 with the server ID of the relay server 200 is added to the management information. When disconnection of the WebSocket connection between the terminal device 300 and the relay server 200 is notified from the terminal device 300 or the relay server 200, the record to which the management information corresponds will be deleted.

In response to the request from the request reception unit 140, the determination unit 160 determines the relay server 200 with which the terminal device 300 that makes the connection destination determination request should establish the WebSocket connection from among the plurality of relay servers 200. At this time, the determination unit 160 determines the relay server 200 with which the terminal device 300 should establish the WebSocket connection, based on the state information stored in the state storage 110 and the management information stored in the management information storage 150.

Specifically, for the terminal device 300 (terminal device 300A) that has made the connection destination determination request first among the pair (terminal devices 300A and 300B illustrated in FIG. 1) of terminal devices 300 that perform two-way communication, the determination unit 160 refers to the state information stored in the state storage 110 to determine the relay server 200 with the low loaded condition or with the small terminal connection number among the plurality of relay servers 20C as the relay server 200 with which the WebSocket connection should be established.

On the other hand, for the terminal device 300 (terminal device 300B) that has made the connection destination determination request later, the determination unit 160 refers to the management information stored in the management information storage 150 to determine the relay server 200 with which the terminal device 300 (terminal device 300A) that has made the connection destination determination request first has established the WebSocket connection as the relay server 200 with which the terminal device 300 (terminal device 300B) that has made the connection destination determination request later should establish the WebSocket connection. That is, the determination unit 160 causes the pair of terminal devices 300 that perform two-way communication to connect to the same relay server 200.

At this time, the determination unit 160 refers to the state information stored in the state storage 110 to check the loaded condition or terminal connection number of the relay server 200 with which the terminal device 300 (terminal device 300A) that has made the connection destination determination request first has established the WebSocket connection. When the loaded condition or terminal connection number of the relay server 200 exceeds a predetermined threshold, the determination unit 160 instructs the relay server 200 to disconnect the WebSocket connection with the terminal device 300 (terminal device 300A). When the request reception unit 140 receives a connection destination determination request from the terminal device 300 (terminal device 300A) with which the WebSocket connection with the relay server 200 is disconnected, the determination unit 160 determines the same relay server 200 with the low loaded condition or small terminal connection number as the relay server 200 with which both terminal devices 300 (terminal devices 300A and 300B) should establish the WebSocket connection.

The determination unit 160 passes thus-determined server ID of the relay server 200 to the request reception unit 140. In addition, the determination unit 160 associates the terminal ID of the terminal device 300 that has made the connection destination determination request with the server ID of the determined relay server 200, and adds a new record to the management information stored in the management information storage 150.

Next, processes to be performed by the communication system of the embodiment will be specifically described with suitable reference to the drawings. The following describes processes in an order of a process of establishing the WebSocket connection between the terminal device 300 and the relay server 200 (connection establishment), a process in which the connection management server 100 regularly acquires the state information of the relay server 200 and updates the state storage 110 (regular update), and a process in which the connection management server 100 irregularly acquires the state information from the relay server 200 and updates the state storage 110 (irregular update).

In the following description, it is assumed that a terminal device 300A (terminal ID (IP address)=192.168.0.3, and a terminal device 300B (terminal ID (IP address)= 192.168.0.4) perform two-way communication. As described above, it is assumed that a correspondence between the terminal device 300A and terminal device 300B that perform two-way communication is statically registered in advance in the connection management server 100 and the relay server 200, for example, as information that associates the terminal ID. It is not necessary to cause the connection management server 100 and the relay server 200 to know the correspondence between the terminal device 300A and the terminal device 300B in such a form. For example, it is possible to identify that the terminal device 300A and the terminal device 300B are a pair that performs two-way communication by assigning a common group ID to both the terminal device 300A and the terminal device 300B. In this case, in communication between the terminal device 300 and one of the connection management server 100 and the relay server 200, the notification of this group ID in addition to the terminal ID of the terminal device 300 allows the connection management server 100 and the relay server 200 to know the correspondence of the terminal devices 300 that perform two-way communication.

Connection Establishment

First, a process flow will be described in which the terminal device 300A makes the WebSocket connection request to the relay server 200 that is determined by the connection management server 100 until the WebSocket connection between the terminal device 300A and the relay server 200 is established.

The terminal device 300A starts a process at an arbitrary timing, for example, with an operation of a user interface by a user who uses the terminal device 300A as a trigger. First, the determination request unit 310 of the terminal device 300A sends an HTTP request that represents a connection destination determination request to the connection management server 100. The sent HTTP request is received by the request reception unit 140 of the connection management server 100. On receipt of the HTTP request from the terminal device 300A, the request reception unit 140 requests the determination unit 160 to determine a relay server 200 with which the terminal device 300A should establish the WebSocket connection.

In response to the request from the request reception unit 140, the determination unit 160 first reads the state information stored in the state storage 110. As illustrated in FIG. 4, the state storage 110 stores therein the state information (CPU utilization ratio, amount of available memory capacity, and terminal connection number in the example of FIG. 4) of each of the plurality of relay servers 200, the state information being associated with the server ID (IP address in the example of FIG. 4) of each relay server 200. Based on the state information read from the state storage 110, the determination unit 160 determines the relay server 200 with the low loaded condition or the relay server 200 with the small terminal connection number from among the plurality of relay servers 200 as the relay server 200 with which the WebSocket connection should be established.

For example, the determination unit 160 determines a relay server 200 with the minimum terminal connection number as the relay server 200 with which the terminal device 300A should establish the WebSocket connection. In the case of the example illustrated in FIG. 4, since the relay server 200 with a server ID=192.168.0.2 has the terminal connection number smaller than the terminal connection number of the relay server 200 with a server ID=192.168.0.1, the relay server 200 with the server ID=192.168.0.2 is selected.

Upon determining the relay server 200 with which the terminal device 300A should establish the WebSocket connection, the determination unit 160 passes the server ID=192.168.0.2 of the relay server 200 to the request reception unit 140. In addition, the determination unit 160 associates the terminal ID=192.168.0.3 of the terminal device 300A with the server ID=192.168.0.2 of the determined relay server 200, and adds the IDs to a management information record stored in the management information storage 150. As illustrated in FIG. 5, this causes the management information storage 150 to store a set of terminal ID=192.168.0.3 and server ID=192.168.0.2 as management information.

When the server ID=192.168.0.2 of the relay server 200 is passed from the determination unit 160, the request reception unit 140 makes an HTTP response including this server ID to the terminal device 300A.

When the HTTP response including the server ID=192.168.0.2 is received as a response to the HTTP request representing the connection destination determination request, the determination request unit 310 of the terminal device 300A passes the server ID=192.168.0.2 included in this HTTP response to the connection request unit 320. When the server ID=192.168.0.2 is passed from the determination request unit 310, the connection request unit 320 sends a handshake request for establishing the WebSocket connection to the relay server 200 identified by this server ID as a WebSocket connection request. Hereinafter, processing of connection establishment is performed in accordance with the procedure determined by RFC6455, and the WebSocket connection between the terminal device 300A and the relay server 200 is established.

Next, a process flow will be described in which, in a state where the WebSocket connection between the terminal device 300A and the relay server 200 has been established, the terminal device 300B makes the WebSocket connection request to the relay server 200 determined by the connection management server 100 until the WebSocket connection between the terminal device 300B and the relay server 200 is established.

The terminal device 300B sends an HTTP request to the connection management server 100 by a procedure similar to the procedure of the terminal device 300A. The sent HTTP request is received by the request reception unit 140 of the connection management server 100. Upon receipt of the HTTP request from the terminal device 300B, the request reception unit 140 requests the determination unit 160 to determine the relay server 200 with which the terminal device 300B should establish the WebSocket connection.

In response to the request from the request reception unit 140, the determination unit 160 first refers to the management information storage 150 to check existence of a record including the terminal ID=192.168.0.3 of the terminal device 300A that is a pair with the terminal device 300B. It is assumed here that the management information illustrated in FIG. 5 is stored in the management information storage 150. Then, the determination unit 160 determines the relay server 200 with the server ID=192.168.0.2 associated with the terminal ID=192.168.0.3 of the terminal device 300A as the relay server 200 with which the terminal device 300B should establish the WebSocket connection.

When the relay server 200 with which the terminal device 300B should establish the WebSocket connection is determined, the determination unit 160 passes the server ID=192.168.0.2 of the relay server 200 to the request reception unit 140. In addition, the determination unit 160 associates the terminal ID=192.168.0.4 of the terminal device 300B with the server ID=192.168.0.2 of the determined relay server 200, and adds the IDs to the management information record stored by the management information storage 150.

When the server ID=192.168.0.2 of the relay server 200 is passed from the determination unit 160, the request reception unit 140 makes an HTTP response including this server ID to the terminal device 300B.

Upon receipt of the HTTP response including the server ID=192.168.0.2, the determination request unit 310 of the terminal device 300B passes the server ID=192.168.0.2 included in this HTTP response to the connection request unit 320. When the server ID=192.168.0.2 is passed from the determination request unit 310, the connection request unit 320 sends a handshake request for establishing the WebSocket connection to the relay server 200 identified by this server ID as a WebSocket connection request. Hereinafter, processes of the connection establishment are performed in accordance with the procedure determined by RFC6455, and the WebSocket connection between the terminal device 300B and the relay server 200 is established.

Regular Update

Next, with reference to FIG. 6, a process flow will be described in which the connection management server 100 regularly acquires the state information of the relay server 200 and updates the state storage 110. FIG. 6 is a sequence diagram illustrating an outline of a regular update. While FIG. 6 illustrates processes performed only by one relay server 200, similar processes are performed by the plurality of relay servers 200.

The state acquisition unit 210 of the relay server 200 starts a process at predetermined regular timing, and acquires its own state information by an arbitrary method. For example, the state acquisition unit 210 acquires a value of a CPU utilization ratio or memory usage using an application programming interface (API) provided by an operating system (OS), or acquires a value of the number of WebSocket connections that are currently in a connection state by making an inquiry to the connection establishment unit 230.

Upon completion of acquisition of the state information, the state acquisition unit 210 outputs the acquired state information together with its own server ID to the storage device 400 to request registration. The state acquisition unit 210 repeats the above processes at predetermined regular timing (step S201-1, step S201-2, step S201-3). Every time the request for the state information registration is received from the relay server 200, the storage device 400 associates the state information sent from the relay server 200 with the server ID and stores the information. At this time, when the state information corresponding to the server ID sent from the relay server 200 already exists, the storage device 400 updates the state information by overwriting with the newly sent state information.

In contrast, the regular update unit 121 of the connection management server 100 starts a process at predetermined regular timing, and requests the storage device 400 to read the state information. Then, the regular update unit 121 acquires the state information read from the storage device 400 (step S202), and updates the state storage 110 with the acquired state information (step S203). The regular update unit 121 repeats the above processes at predetermined regular timing. It is unnecessary that timing and intervals at which the regular update unit 121 performs the above processes coincide with timing and intervals at which the relay server 200 registers the state information in the storage device 400. By extending a period in which the regular update unit 121 performs the above processes, it is possible to reduce the load of the connection management server 100.

Irregular Update

Next, a process flow will be described in which the connection management server 100 irregularly acquires the state information from the relay server 200 and updates the state storage 110.

The irregular update unit 122 of the connection management server 100 starts a process irregularly, for example, with the failure in the WebSocket connection establishment between the terminal device 300 and the relay server 200 as a trigger. That is, as described above, when the status information about the connection failure is notified from the relay server 200, the determination request unit 310 of the terminal device 300 sends again the HTTP request representing the connection destination determination request to the connection management server 100. At this time, the determination request unit 31C adds the server ID (server ID=192.168.0.2 in the above example) of the relay server 200 that has previously failed in the connection establishment to the HTTP request to send.

Upon receipt of the HTTP request from the terminal device 300, the request reception unit 140 of the connection management server 100 checks whether the information about the server ID is added to the HTTP request. Then, when the server ID is added to the received HTTP request, the request reception unit 140 passes the server ID to the irregular update unit 122 to make an update request of the state information. In response to this request, the irregular update unit 122 passes the server ID to the acquisition request unit 130 to make an acquisition request of the state information. In response to this request, the acquisition request unit 130 sends the HTTP request representing the acquisition request of the state information to the relay server 200 identified by the server ID.

Upon receipt of the HTTP request from the connection management server 100, the acquisition request reception unit 220 of the relay server 200 makes an acquisition request of the state information to the state acquisition unit 210. In response to this request, the state acquisition unit 210 acquires its own state information and passes the information to the acquisition request reception unit 220. The acquisition request reception unit 220 generates an HTTP response including the state information and sends the HTTP response to the connection management server 100 as a response to the HTTP request.

Figures 7, 8:
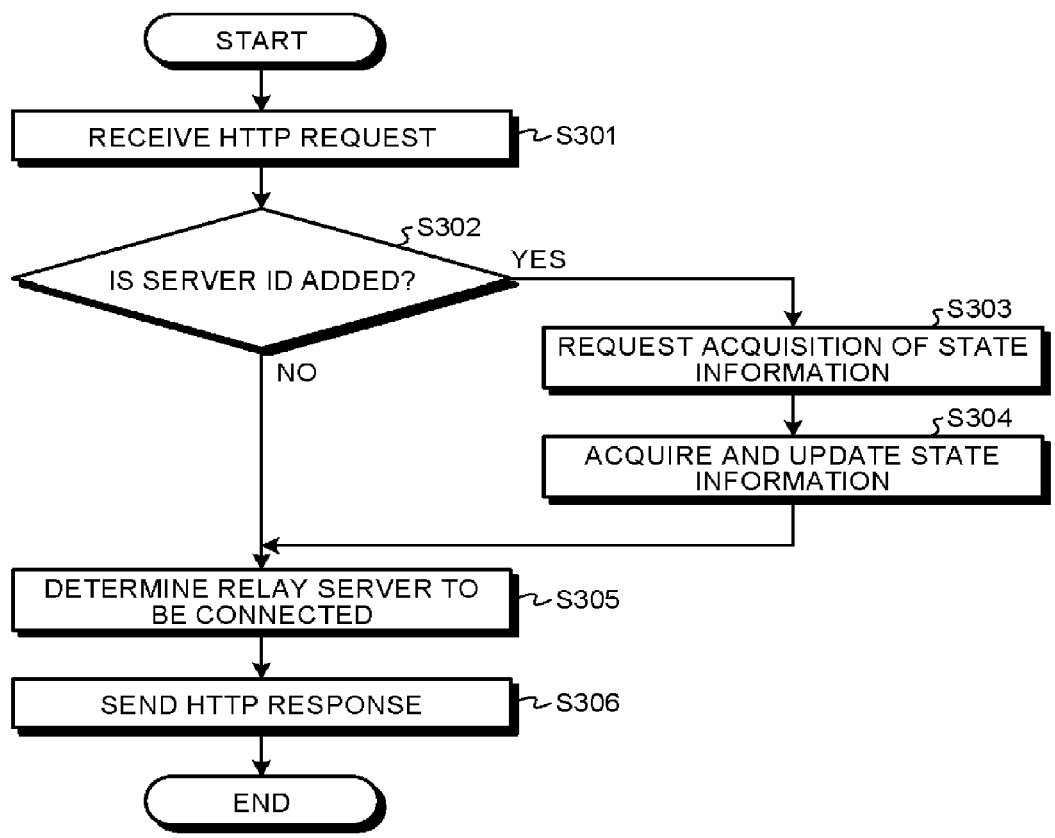
FIG. 7 is a diagram illustrating how the state information is overwritten.
FIG. 8 is a flow chart illustrating a process procedure of a connection management server including an irregular update.

On receipt of the HTTP response from the relay server 200, the acquisition request unit 130 of the connection management server 100 takes out the state information from this HTTP response and passes the state information to the irregular update unit 122. Then, the irregular update unit 122 updates the state storage 110 with the state information received from the acquisition request unit 130. FIG. 7 illustrates how this process overwrites the state information stored by the state storage 110. The example of FIG. 7 illustrates a situation in which, as a result of the update of the state information by the irregular update unit 122, a drastic increase is observed in the terminal connection number of the relay server 200 of the server ID=192.168.0.2, and a decrease is observed in a reserve CPU utilization ratio and amount of available memory capacity.

By the above-described method, in the connection management server 100, apart from the regular update of the state storage 110 by the regular update unit 121, the irregular update of the state storage 110 by the irregular update unit 122 is performed, with the failure in the WebSocket connection establishment between the terminal device 300 and the relay server 200 as a trigger. After such irregular update is performed, in the same way as in the case where an HTTP request with no server ID added is received, the relay server 200 is determined by the determination unit 160, and an HTTP response including the server ID of this relay server 200 is sent to the terminal device 300. At this time, for example, when the state information stored in the state storage 110 is updated as illustrated in FIG. 7, the determination unit 160 selects the relay server 200 of the server ID=192.168.0.1 as the relay server 200 with which the terminal device 300 should establish the WebSocket connection. As a result, the terminal device 300 receives the HTTP response including the server ID=192.168.0.1, and makes the WebSocket connection request to the relay server 200 with the server ID=192.168.0.1.

FIG. 8 is a flow chart illustrating a process procedure of the connection management server 100 including the irregular update. Essential points of the processes in the connection management server 100 will be described below in accordance with this flow chart.

First, the request reception unit 140 receives an HTTP request from the terminal device 300 (step S301), and checks whether a server ID is added to the received HTTP request (step S302). Then, when a server ID is added to the HTTP request (step S302: Yes), the acquisition request unit 130 makes an acquisition request of state information to the relay server 200 identified by the server ID (step S303). Then, in response to the acquisition request of the state information, the irregular update unit 122 acquires the state information sent from the relay server 200 and updates the state storage 110 (step S304). On the other hand, when a server ID is not added to the HTTP request received at step S301 (step S302: No), processes at step S303 and step S304 are not performed.

Next, based on the state information stored in the state storage 110 and management information stored on the management information storage 150, the determination unit 160 determines the relay server 200 to which the terminal device 300 that has sent the HTTP request is to be connected (step S305). At this time, when irregular updating of the state storage 110 is performed at step S303 and step S304, the determination unit 160 determines the relay server 200 to which the terminal device 300 is to be connected, based on the state information in the state storage 110 updated by the irregular updating. Subsequently, the request reception unit 140 produces an HTTP response including the server ID of the relay server 200 determined by the determination unit 160, sends the HTTP response to the terminal device 300 as a response to the HTTP request (step S306), and a series of processes is finished.

Next, examples of specific operations in the communication system of the embodiment will be described with reference to FIG. 9 and FIG. 10.

Figure 9:
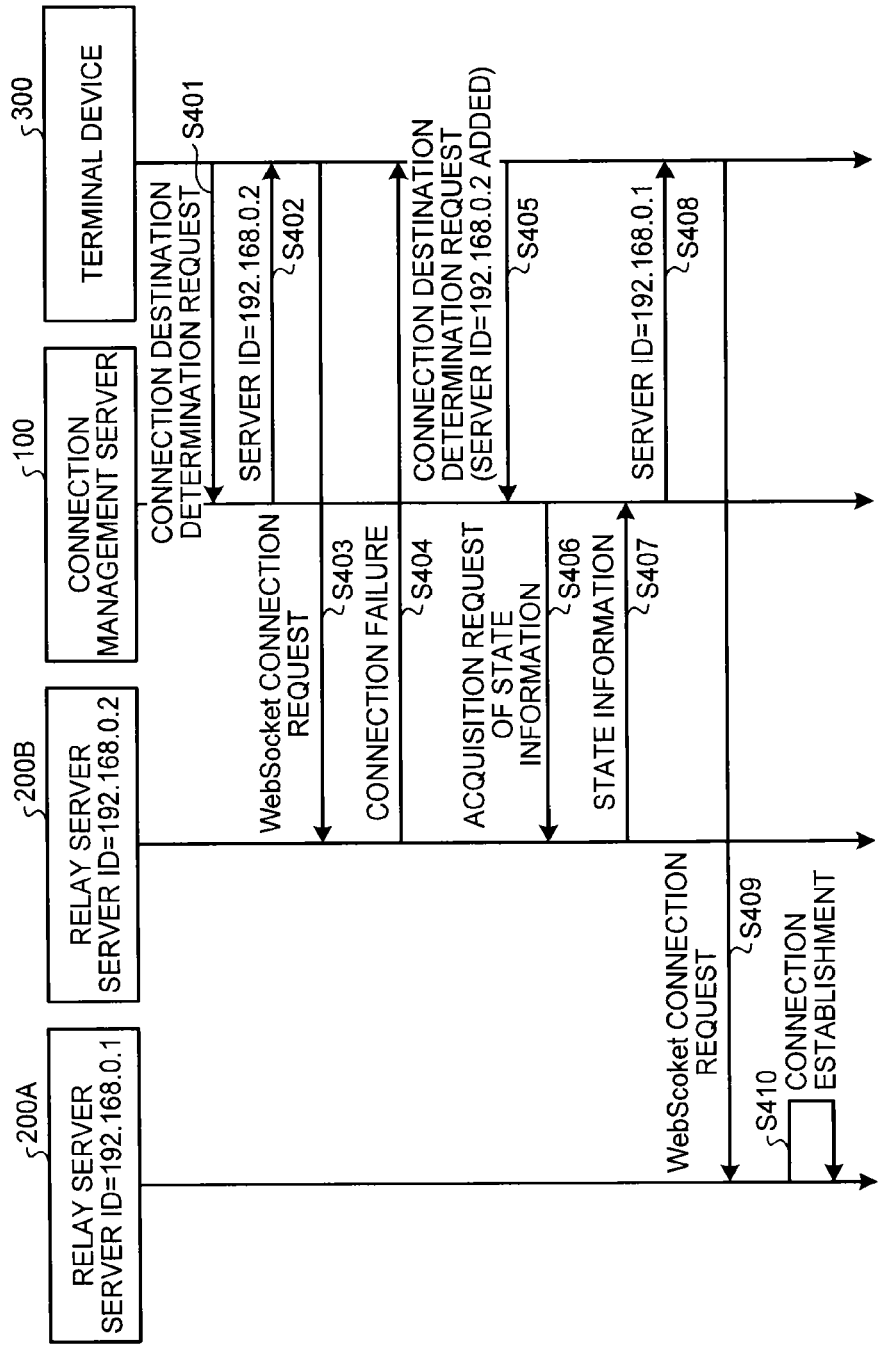
FIG. 9 is a sequence diagram illustrating an example of a specific operation in the communication system according to the embodiment.

FIG. 9 is a sequence diagram illustrating the example of the operation after a failure in the WebSocket connection establishment between the terminal device 300 and the relay server 200B until the WebSocket connection is established with the relay server 200A.

First, the terminal device 300 makes a connection destination determination request to the connection management server 100 (step S401). In response to the connection destination determination request from the terminal device 300, the connection management server 100 determines the relay server 200B as a connection destination for the terminal device 300, and notifies the terminal device 300 of the server ID=192.168.0.2 of the relay server 200B (step S402).

The terminal device 300 makes the WebSocket connection request to the relay server 200B identified by the server ID=192.168.0.2 notified from the connection management server 100 (step S403). In response to the WebSocket connection request from the terminal device 300, the relay server 200B attempts establishment of the WebSocket connection, but due to a failure in the connection, notifies the terminal device 300 of the status information about the connection failure (step S404).

Upon receipt of the status information about the connection failure from the relay server 200B, the terminal device 300 makes, to the connection management server 100, a connection destination determination request with the server ID=192.168.0.2 of the relay server 200B added (step S405). Since the connection destination determination request from the terminal device 300 includes the server ID=192.168.0.2 of the relay server 200B, the connection management server 100 makes an acquisition request of the state information to the relay server 200B (step S406).

In response to the acquisition request of the state information from the connection management server 100, the relay server 200B acquires its own state information and notifies the information to the connection management server 100 (step S407). The connection management server 100 updates the state storage 110 with the state information received from the relay server 200B, and performs a process to determine the relay server 200 that will be a connection destination for the terminal device 300 in response to the connection destination determination request at step S405. As a result, the connection management server 100 determines the relay server 200A as a connection destination for the terminal device 300, and notifies the terminal device 300 of the server ID=192.168.0.1 of the relay server 200A (step S408).

The terminal device 300 makes the WebSocket connection request to the relay server 200A identified by the server ID=192.168.0.1 notified from the connection management server 100 (step S409). In response to the WebSocket connection request from the terminal device 300, the relay server 200A establishes the WebSocket connection with the terminal device 300 (step S410).

Figure 10:
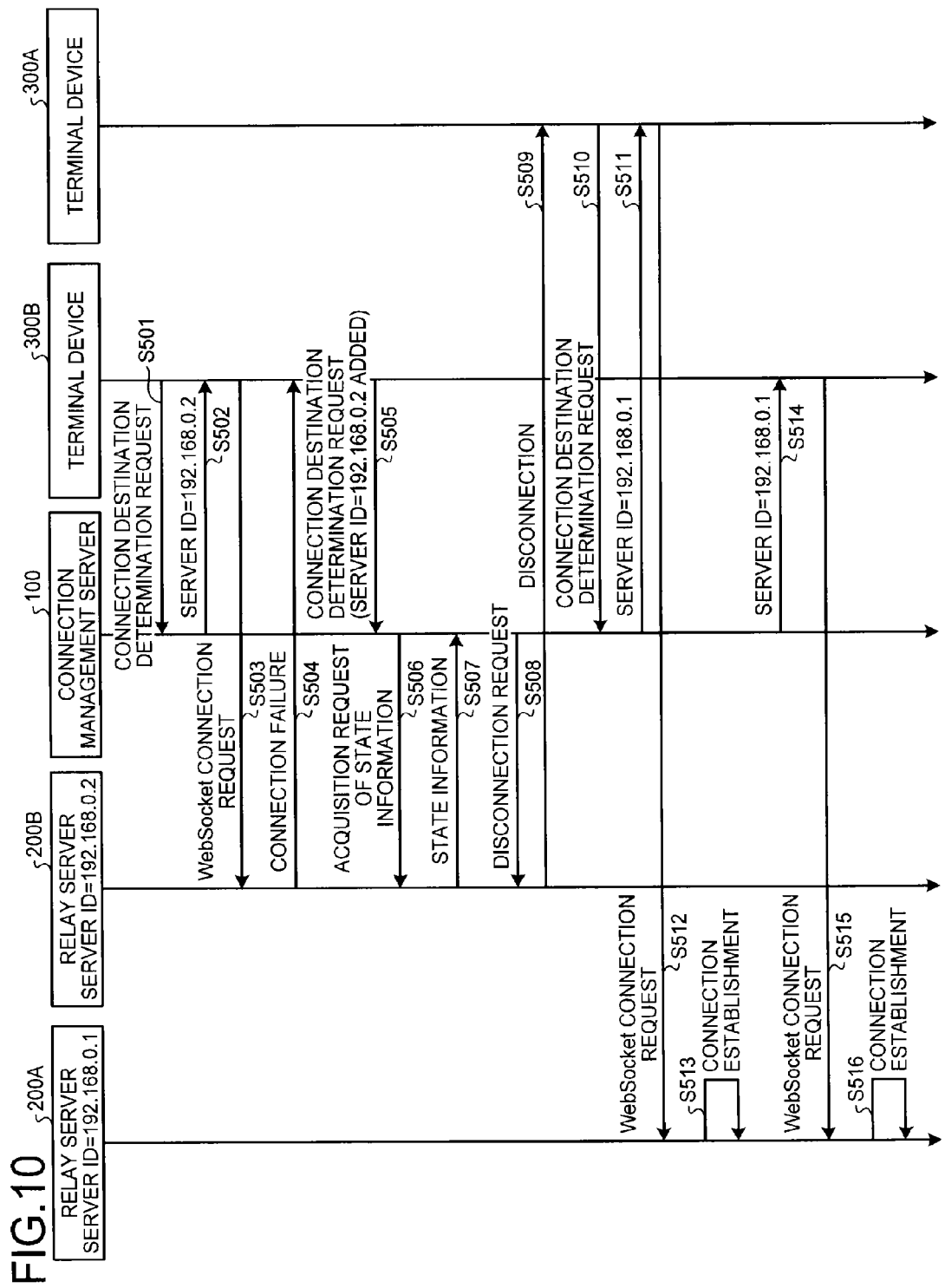
FIG. 10 is a sequence diagram illustrating an example of a specific operation in the communication system according to the embodiment.

FIG. 10 is a sequence diagram illustrating an example of an operation, in a state where the terminal device 300A and the relay server 200B have established the WebSocket connection, when WebSocket connection establishment between the terminal device 300B and the relay server 200B fails, until the WebSocket connection is established between both the terminal device 300A and the terminal device 300B, and the relay server 200A.

First, the terminal device 300B makes a connection destination determination request to the connection management server 100 (step S501). In response to the connection destination determination request from the terminal device 300B, the connection management server 100 determines the relay server 200B that has already established the WebSocket connection with the terminal device 300A as a connection destination for the terminal device 300. Then, the connection management server 100 notifies the terminal device 300B of a server ID=192.168.0.2 of the relay server 200B (step S502).

The terminal device 300B makes the WebSocket connection request to the relay server 200B identified by the server ID=192.168.0.2 notified from the connection management server 100 (step S503). In response to the WebSocket connection request from the terminal device 300B, the relay server 200B attempts establishment of the WebSocket connection, but due to a failure in the connection, notifies the terminal device 300B of the status information about the connection failure (step S504).

Upon receipt of the status information about the connection failure from the relay server 200B, the terminal device 300B makes a connection destination determination request with added server ID=192.168.0.2 of the relay server 200B to the connection management server 100 (step S505). Since the connection destination determination request from the terminal device 300B includes the server ID=192.168.0.2 of the relay server 200B, the connection management server 100 makes an acquisition request of the state information to the relay server 200B (step S506).

In response to the acquisition request of the state information from the connection management server 100, the relay server 200B acquires its own state information and notifies the information to the connection management server 100 (step S507). The connection management server 100 updates the state storage 110 with the state information received from the relay server 200B. In addition, the connection management server 100 makes a disconnection request to the relay server 200B saying that the already established WebSocket connection with the terminal device 300A is to be disconnected (step S508). Upon receipt of the disconnection request from the connection management server 100, the relay server 200B disconnects the WebSocket connection with the terminal device 300A in response to this disconnection request (step S509). Processes at step S508 and step S509 may be performed before processes at step S506 and step S507.

When the WebSocket connection with the relay server 200B is disconnected, the terminal device 300A detects this disconnection and makes a connection destination determination request to the connection management server 100 (step S510). In response to the connection destination determination request from the terminal device 300A, the connection management server 100 determines the relay server 200A as a new connection destination for the terminal device 300A, and notifies the terminal device 300A of a server ID=192.168.0.1 of the relay server 200A (step S511).

The terminal device 300A makes the WebSocket connection request to the relay server 200A identified by the server ID=192.168.0.1 notified from the connection management server 100 (step S512). In response to the WebSocket connection request from the terminal device 300A, the relay server 200A establishes the WebSocket connection with the terminal device 300A (step S513).

After determining the relay server 200A as a new connection destination for the terminal device 300A, in response to the connection destination determination request from the terminal device 300B at step S505, the connection management server 100 determines, as a connection destination for the terminal device 300B, the relay server 200A that will be a connection destination in common with the terminal device 300A, and notifies the server ID=192.168.0.1 of the relay server 200A to the terminal device 300B (step S514).

The terminal device 300B makes the WebSocket connection request to the relay server 200A identified by the server ID=192.168.0.1 notified from the connection management server 100 (step S515). In response to the WebSocket connection request from the terminal device 300B, the relay server 200A establishes the WebSocket connection with the terminal device 300B (step S516).

As described in detail above citing specific examples, in the embodiment, the state storage 11C for storing the state information of each of the plurality of relay servers 200 is provided in the connection management server 100. While updating the state storage 110 in accordance with a predetermined rule, the connection management server 100 determines the relay server 200 with which the terminal device 300 should establish the WebSocket connection, based on the state information stored in the state storage 110. Therefore, according to the embodiment, when a fault or sharp load increase occurs in any of the relay servers 200, the connection management server 100 can know the occurrence promptly, avoid choosing the relay server 200 in which the fault or sharp load increase has occurred, and properly determine the relay server 200 with which the terminal device 300 should establish the WebSocket connection.

Particularly, used in the embodiment are the regular update of the state storage 110 by the regular update unit 121, in combination with the irregular update of the state storage 110 by the irregular update unit 122, for example, the update of the state storage 110 at a timing when another connection destination determination request is received from the terminal device 300 that has failed in establishment of the WebSocket connection with the relay server 200. Therefore, in an ordinary state, it is possible to control loads of both the connection management server 100 and relay server 200 that are involved in acquisition of the state information. When the fault or sharp load increase occurs in the relay server 200, the connection management server 100 can promptly know the occurrence and properly determine the relay server 200 with which the terminal device 300 should establish the WebSocket connection.

In the above-described embodiment, the irregular update unit 122 of the connection management server 100 acquires the state information directly from the relay server 200, but the embodiment is not limited to this example. For example, the state acquisition unit 210 of the relay server 200 may store, in the storage device 400, the state information acquired irregularly in response to a request from the acquisition request reception unit 220, and the irregular update unit 122 of the connection management server 100 may acquire the state information of the relay server 200 from the storage device 400 in the same way as in the regular update unit 121.

Figure 11:
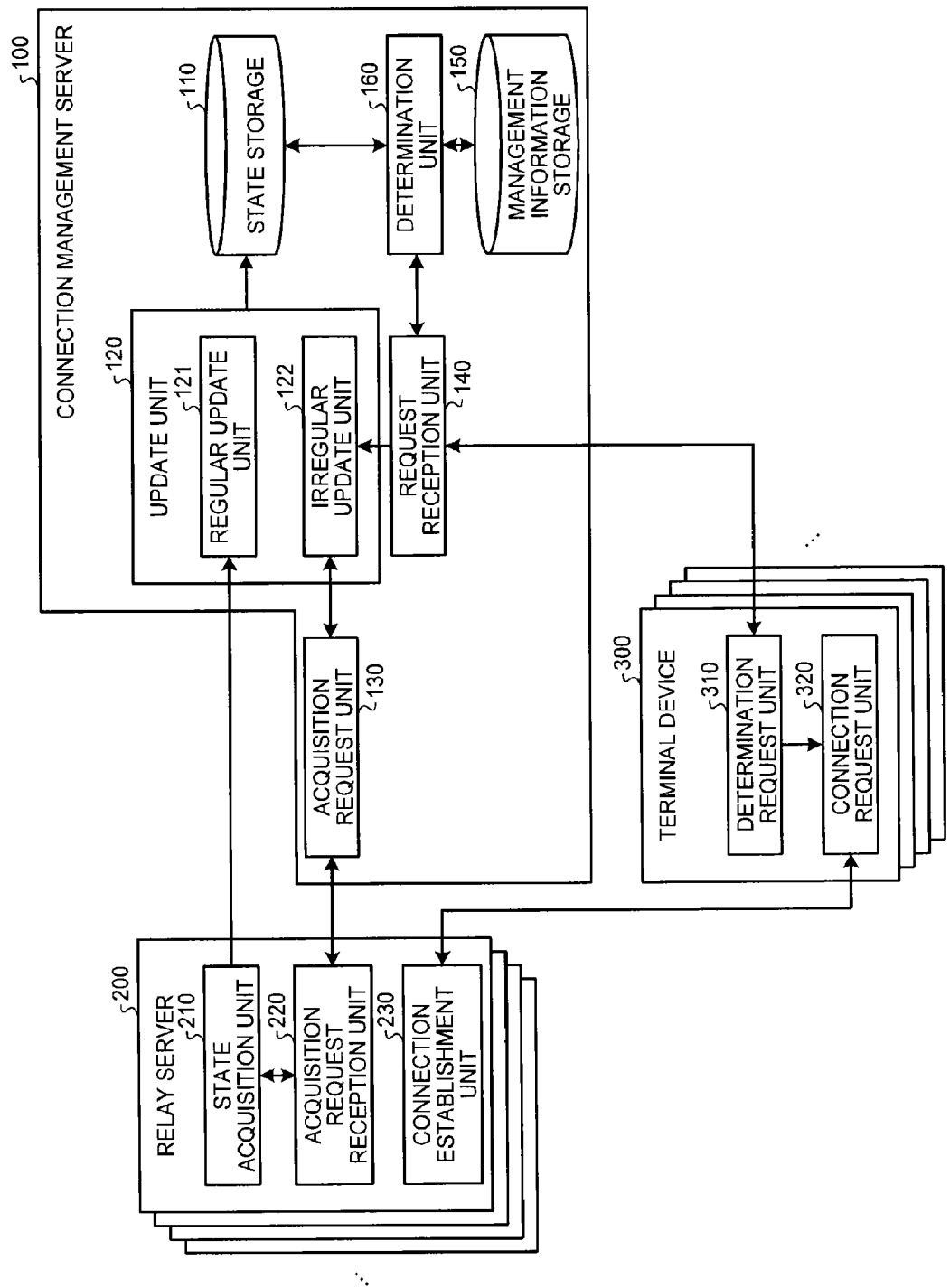
FIG. 11 is a diagram illustrating a configuration of the communication system that does not include a storage device.

In the above-described embodiment, the regular update unit 121 of the connection management server 100 acquires the state information of the relay server 200 via the storage device 400, but the embodiment is not limited to this example. For example, the regular update unit 121 of the connection management server 100 may regularly acquire the state information directly from each of the plurality of relay servers 200. FIG. 11 illustrates a configuration example in this case. The configuration example illustrated in FIG. 11 is a configuration example illustrated in FIG. 3 with the storage device 400 excluded therefrom. In the case of the configuration illustrated in FIG. 11, the state acquisition unit 210 of each relay server 200 acquires the state information at a predetermined regular timing, adds its own server ID to the acquired state information, and sends the state information to the connection management server 100. The regular update unit 121 of the connection management server 100 receives the state information from each relay server 200 and updates the state storage 110. A method of sending the state information from the relay server 200 to the connection management server 100 is not limited to a push method described above. The method may be a pull method in which the regular update unit 121 of the connection management server 100 makes an acquisition request of the state information to the relay server 200 regularly, and in response to the request, acquires the state information sent from the relay server 200.

In the above-described embodiment, the WebSocket connection is made between the relay server 200 and the terminal device 300, but the embodiment is not limited to this example. It is possible to apply an arbitrary method by a connection-oriented communication protocol to the communication connection between the relay server 200 and the terminal device 300. In the above-described embodiment, various requests and responses thereto among the connection management server 100, the relay server 200, and the terminal device 300 are made by HTTP requests and responses, but the embodiment is not limited to this example.

In the above-described embodiment, the state information refers to a combination of the CPU utilization ratio, amount of available memory capacity, and terminal connection number of the relay server 200, but the embodiment is not limited to this example. The state information of the relay server 200 may be information including at least one of the loaded condition and terminal connection number of the relay server 200. For example, the state information may include information about a network condition and disk read/write condition of the relay server 200. In addition, the state information may include status check results (truth value representing whether services can be provided) of the relay server 200 performed by the state acquisition unit 210. In addition, the state information may include truth values of response success or failure when the acquisition request unit 130 of the connection management server 100 makes an acquisition request of the state information to the relay server 200. In addition, the state information may include ping trial results obtained when the connection management server 100 pings the relay server 200. In addition, the state information may include information such as an increase and decrease in the terminal connection number of the relay server 200 during a past certain period, the number of times of past connection failures, and statistics of the ping trial results performed with the connected terminal device 300.

In the above-described embodiment, the irregular update unit 122 of the connection management server 100 updates the state storage 110 with the failure in the WebSocket connection establishment between the terminal device 300 and the relay server 200 as a trigger, but the embodiment is not limited to this example. The embodiment may be configured such that, for example, when the WebSocket connection is established between the terminal device 300 and the relay server 200 but it takes long time to complete the connection establishment, the WebSocket connection establishment is regarded as a failure and the irregular update unit 122 of the connection management server 100 updates the state storage 110.

In the above-described embodiment, when the terminal device 300 that has failed in the WebSocket connection establishment with the relay server 200 makes a connection destination determination request again to the connection management server 100, the terminal device 300 sends the HTTP request with added server ID of the relay server 200 that has failed in the WebSocket connection establishment, but the embodiment is not limited to this example. For example, a notification different from the connection destination determination request may be defined between the connection management server 100 and the terminal device 300, and apart from the HTTP request representing the connection destination determination request, with this notification, the terminal device 300 may send the server ID of the relay server 200 that has failed in the WebSocket connection establishment to the connection management server 100. In this case, the HTTP request representing the connection destination determination request and the notification of the server ID of the relay server 200 may be sent from the terminal device 300 to the connection management server 100 at separate timing.

In the above-described embodiment, when the connection destination determination request from the terminal device 300 includes the server ID of the relay server 200, the irregular update unit 122 of the connection management server 100 irregularly acquires the state information from the relay server 200 identified by this server ID, but the embodiment is not limited to this example. For example, the embodiment may be configured such that, when the terminal device 300 makes a connection destination determination request to the connection management server 100, information is added about a truth value indicating whether the state storage 110 needs to be updated, and when the value included in the connection destination determination request is truth, that is, when the connection destination determination request includes the update request of the state storage 110, the irregular update unit 122 of the connection management server 100 acquires the state information from each of the plurality of relay servers 200 and updates the state storage 110. In addition, the embodiment may be configured such that the connection destination determination request that is made again by the terminal device 300 to the connection management server 100 has a form different from a form of an ordinary connection destination determination request, the terminal device 300 having failed in the WebSocket connection establishment with the relay server 200, and when the terminal device 300 makes the connection destination determination request again, the irregular update unit 122 of the connection management server 100 acquires the state information from each of the plurality of relay servers 200 to update the state storage 110.

In the above-described embodiment, the irregular update unit 122 of the connection management server 100 performs an irregular update of the state storage 110 with another connection destination determination request from the terminal device 300 as a trigger, but the embodiment is not limited to this example. For example, the embodiment may be configured such that, the connection management server 100 pings the relay server 200, for example, at one-second intervals, and with a failure in arrival check results as a trigger, the irregular update unit 122 acquires the state information from the relay server 200 to update the state storage 110. In addition, the embodiment may be configured such that connection-oriented communication, such as transmission control protocol (TCP), is established in advance between the connection management server 100 and each relay server 200, and with receipt of a notification of communication disconnection with a certain relay server 200 as a trigger, the irregular update unit 122 acquires the state information from the relay server 200 to update the state storage 110.

Each of the above-described processing functions (update unit 120, acquisition request unit 130, request reception unit 140, and determination unit 160) of the connection management server 100 can be implemented by, for example, a program (software) executed using a general-purpose computer system as basic hardware. The above-described state storage 110 and the management information storage 150 of the connection management server 100 can be implemented using memory resources included in the computer system.

Figure 12:
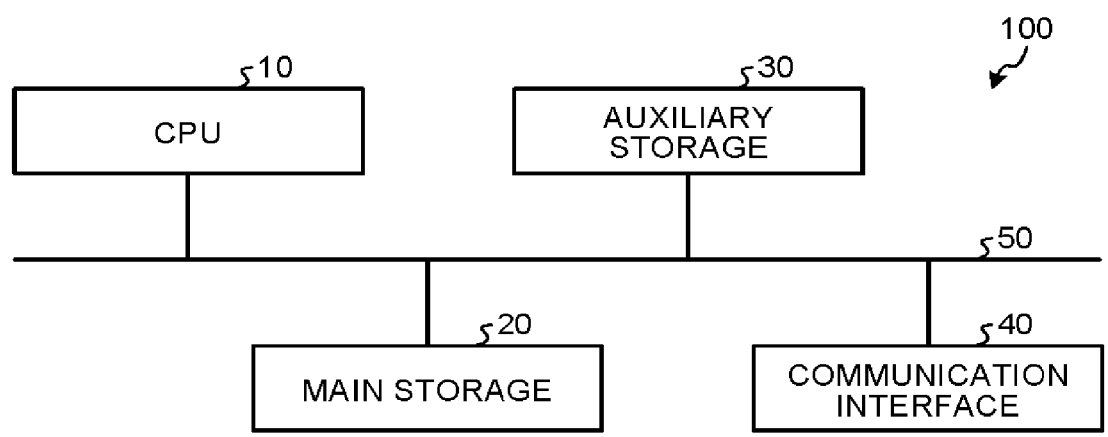
FIG. 12 is a diagram illustrating an example of a hardware configuration of a connection management device.

FIG. 12 is a diagram illustrating an example of a hardware configuration of the connection management server 100. As illustrated in FIG. 12, the connection management server 100 is configured as a general-purpose computer system including a CPU 10, a main storage 20, an auxiliary storage 30, a communication interface 40, and a bus 50 for connecting respective units. The auxiliary storage 30 may be connected to each unit by a network such as a wired or wireless local area network (LAN).

Each of the above-described processing functions of the connection management server 100 can be implemented when, for example, the CPU 10 uses the main storage 20 to execute a program stored in the auxiliary storage 30 or the like. This program has a modular configuration including each of the above-described processing functions (update unit 120, acquisition request unit 130, request reception unit 140, and determination unit 160) of the connection management server 100. This program is configured such that each of the above-described processing functions of the connection management server 100 is loaded in the main storage 20 and generated in the main storage 20 by the CPU 10 reading and executing the program as appropriate.

In the same manner as in the connection management server 100, each of the above-described processing functions (state acquisition unit 210, acquisition request reception unit 220, and connection establishment unit 230) of the relay server 200 can be implemented by the program (software) executed using the computer system as illustrated in FIG. 12 as basic hardware. This program has a modular configuration including each of the above-described processing functions of the relay server 200. This program is configured such that each of the above-described processing functions of the relay server 200 is loaded in the main storage 20 and generated in the main storage 20 by the CPU 10 reading and executing the program as appropriate.

In the same manner as in the connection management server 100 and the relay server 200, each of the above-described processing functions (determination request unit 310 and connection request unit 320) of the terminal device 300 can be implemented by the program (software) executed using the computer system as illustrated in FIG. 12 as basic hardware. This program has a modular configuration including each of the above-described processing functions of the terminal device 300. This program is configured such that each of the above-described processing functions of the terminal device 300 is loaded in the main storage 20 and generated in the main storage 20 by the CPU 10 reading and executing the program as appropriate.

Each of the programs is recorded in, for example, a magnetic disk (flexible disk, hard disk, and the like), an optical disc (CD-ROM, CD-R, CD-RW, DVD-ROM, DVD±R, DVD±RW, Blu-ray (registered trademark) disc, and the like), a semiconductor memory, or a similar recording medium and provided. The recording medium for recording the program may have any storage form as long as the computer system can read the recording medium.

Each of the processing functions may be implemented by installing each of the programs in the computer system in advance, and the program may be configured such that the program distributed via a network is suitably installed in the computer system. The programs may be configured such that each of the programs is executed by an external server computer, and a result is received via a network by each of the connection management server 100, relay server 200, and terminal device 300 that are each configured as a client computer.

Each of the above-described processing functions of the connection management server 100 can be implemented not only by the program (software). Part or all of the processing functions can also be implemented by dedicated hardware, such as an application specific integrated circuit (ASIC) and a field-programmable gate array (FPGA). Similarly, part or all of the processing functions of the relay server 200 can also be implemented by dedicated hardware, such as ASIC and FPGA. Similarly, part or all of the processing functions of the terminal device 300 can also be implemented by dedicated hardware, such as ASIC and FPGA.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A connection management device in a communication system in which a plurality of relay devices are provided for relaying communication between two terminal devices associated with each other in advance, the connection management device determining a relay device with which each of the terminal devices should establish connection and notifying each of the terminal devices of a determination result, the connection management device comprising:
   a first storage that stores therein state information including at least one of a loaded condition and terminal connection number with respect to each of the plurality of relay devices;
   a first updater that acquires the state information regularly to update the first storage;
   a second updater that acquires the state information irregularly to update the first storage;
   a request receiver that receives, from any one of the terminal devices, a determination request of a relay device with which the terminal device should establish connection; and
   a determiner that determines the relay device with which the terminal device making the determination request should establish connection, based on the state information stored in the first storage,
   wherein, when the determination request includes an identifier of the relay device,
   the state information is irregularly acquired from the relay device identified by the identifier to update the first storage, and
   the relay device with which the terminal device making the determination request should establish connection, is determined based on the state information stored in the first storage after being updated by irregularly acquiring the state information.

2. The device according to claim 1, wherein when the determination request includes an update request of the state information, the second updater acquires the state information to update the first storage, and
   wherein the determiner determines the relay device with which the terminal device making the determination request should establish connections, based on the state information stored in the first storage after being updated by the second updater.

3. The device according to claim 2, wherein the second updater further updates the first storage when a communication defect with any one of the relay devices is detected.

4. The device according to claim 3, wherein the second updater updates the first storage when disconnection with any one of the relay devices is detected.

5. The device according to claim 3, wherein the second updater updates the first storage when a failure in communication check with any one of the relay devices is detected.

6. The device according to claim 1, wherein the second updater further updates the first storage when a communication defect with any one of the relay devices is detected.

7. The device according to claim 6, wherein the second updater updates the first storage when disconnection with any one of the relay devices is detected.

8. The device according to claim 6, wherein the second updater updates the first storage when a failure in communication check with any one of the relay devices is detected.

9. The device according to claim 1, wherein the determiner determines, as the relay device with which the terminal device making the determination request should establish connection, a relay device with a low loaded condition or with a small terminal connection number from among the plurality of relay devices.

10. The device according to claim 1, further comprising a second storage configured to store therein management information indicating a correspondence between each of the terminal devices and each of the relay devices between which connection has already been established,
wherein the determiner determines the relay device with which the terminal device making the determination request should establish connection, based on the state information stored in the first storage and the management information stored in the second storage.

11. The device according to claim 10, wherein, in a state where a first terminal device associated with a second terminal device in advance has already established connection with any one of the relay devices, when the request receiver receives the determination request from the second terminal device, the determiner determines the relay device with which the first terminal device has established connection as the relay device with which the second terminal device should establish connection.

12. The device according to claim 11, wherein, when the request receiver receives the determination request from the second terminal device, if the loaded condition or terminal connection number of the relay device with which the first terminal device has established connection exceeds a threshold, the determiner instructs the relay device with which the first terminal device has established connection to disconnect the first terminal device, and when the request receiver receives the determination request from the first terminal device that has been disconnected from the relay device, the determiner determines the same relay device as the relay device with which the first terminal device and the second terminal device should establish connections, based on the state information stored in the first storage.

13. A communication system comprising:
the connection management device according to claim 1;
a plurality of terminal devices; and
a plurality of relay devices,
each of the terminal devices including:
a determination requester that makes a determination request to the connection management device; and
a connection requester that makes a connection request to a relay device notified from the connection management device, wherein
each of the relay devices includes a connection establisher that receives the connection request and establishes connection with a terminal device making the connection request.

14. The system according to claim 13, wherein the connection establisher establishes WebSocket connection with the terminal device making the connection request.

15. The system according to claim 13, wherein, the connection management device is the connection management device according to claim 1, and
wherein, when the terminal device fails connection with the relay device notified from the connection management device, the determination requester makes the determination request including an identifier of that relay device to the connection management device.

16. The system according to claim 15, wherein, when the terminal device is disconnected from the relay device, the determination requester further makes the determination request including the identifier of that relay device to the connection management device.

17. The system according to claim 13, wherein the connection management device is the connection management device according to claim 4, and
wherein, when the terminal device fails connection with the relay device notified from the connection management device, the determination requester makes the determination request including the update request to the connection management device.

18. The system according to claim 17, wherein, when the terminal device is disconnected from the relay device, the determination requester further makes the determination request including the update request to the connection management device.

19. A connection management method performed in a connection management device in a communication system in which a plurality of relay devices are provided for relaying communication between two terminal devices associated with each other in advance, the connection management device determining a relay device with which each of the terminal devices should establish connection and notifying the each of terminal devices of a determination result, the connection management device including a storage that stores therein state information including at least one of a loaded condition and terminal connection number with respect to each of the plurality of relay devices, the connection management method comprising:
acquiring the state information regularly to update the first storage;
acquiring the state information irregularly to update the first storage;
receiving, from any one of the terminal devices, a determination request of a relay device with which the terminal device should establish connection; and
determining the relay device with which the terminal device making the determination request should establish connection, based on the state information stored in the storage,
wherein, when the determination request includes an identifier of the relay device,
the state information is irregularly acquired from the relay device identified by the identifier to update the first storage, and
the relay device with which the terminal device making the determination request should establish connection, is determined based on the state information stored in the first storage after being updated by irregularly acquiring the state information.

20. A non-transitory computer-readable medium storing instructions that are executed by a computer used as a connection management device in a communication system in which a plurality of relay devices are provided for relaying communication between two terminal devices associated with each other in advance, the connection management device determining a relay device with which each of the terminal devices should establish connection and notifying each of the terminal devices of a determination result, the computer including a storage that stores therein state information including at least one of a loaded condition and terminal connection number with respect to each of the plurality of relay devices, the instructions causing the computer to:

acquire the state information regularly to update the first storage, acquire the state information irregularly to update the first storage;

receive, from any one of the terminal devices, a determination request of a relay device with which the terminal device should establish connection; and determine the relay device with which the terminal device making the determination request should establish connection, based on the state information stored in the storage, wherein, when the determination request includes an identifier of the relay device, the state information is irregularly acquired from the relay device identified by the identifier to update the first storage, and the relay device with which the terminal device making the determination request should establish connection, is determined based on the state information stored in the first storage after being updated by irregularly acquiring the state information.

\* \* \* \* \*

UNITED STATES PATENT AND TRADEMARK OFFICE
CERTIFICATE OF CORRECTION

PATENT NO. : 9,900,385 B2
APPLICATION NO. : 14/605414
DATED : February 20, 2018
INVENTOR(S) : Hiroshi Kawazoe et al.

It is certified that error appears in the above-identified patent and that said Letters Patent is hereby corrected as shown below:

In the Claims

Column 22, Lines 4-6, change "claim 13, wherein, the connection management device is the connection management device according to claim 1, and" to --claim 13,--; and Column 22, Lines 17-19, change "The system according to claim 13, wherein the connection management device is the connection management device according to claim 4, and" to
--A communication system comprising:
    the connection management device according to claim 4;
    a plurality of terminal devices; and
    a plurality of relay devices,
    each of the terminal devices including:
        a determination requester that makes a determination request to the connection management device; and
        a connection requester that makes a connection request to a relay device notified from the connection management device, wherein
    each of the relay devices includes a connection establisher that receives the connection request and establishes connection with a terminal device making the connection request, and--.

Signed and Sealed this
Twenty-seventh Day of August, 2019

Andrei Iancu
*Director of the United States Patent and Trademark Office*